UNITED STATES PATENT OFFICE.

JOHN A. JUST, OF SYRACUSE, NEW YORK, ASSIGNOR OF ONE-HALF TO D. H. BURRELL & COMPANY, OF LITTLEFALLS, NEW YORK, A FIRM.

BAKING-POWDER.

SPECIFICATION forming part of Letters Patent No. 692,451, dated February 4, 1902.

Application filed May 17, 1901. Serial No. 60,696. (No specimens.)

*To all whom it may concern:*

Be it known that I, JOHN A. JUST, a citizen of the United States, and a resident of Syracuse, in the county of Onondaga and State of New York, have invented a new and useful Improvement in Baking-Powders, of which the following is a specification.

Monocalcic phosphate, or, as this salt is also called, "calcium acid phosphate," "calcium monobasic phosphate," "monocalcium ortho phosphate," or "calcium diphosphate," $Ca(H_2PO_4)_2$, is an extremely deliquescent, hygroscopic, and consequently unstable salt. This salt would form a very desirable acid ingredient for baking-powder if it could be rendered stable and non-hygroscopic; but owing to its extremely-changeable nature and its property to readily absorb moisture it cannot be satisfactorily employed. Starch has been mixed as an absorbent with the moist salt of syrupy consistency; but the action of the strongly-acid salt on the starch develops after a short time more or less offensive odors and renders the mixture undesirable. A baking-powder containing this mixture also deteriorates rapidly by the generation and loss of gas. I have discovered that by combining this salt with casein these difficulties are overcome and a composition is produced which is practically stable and non-hygroscopic.

In practicing my invention I proceed as follows: I combine about fifty parts, by weight, of casein with about one hundred parts of calcium acid phosphate having a syrupy consistency. The casein is preferably prepared from skim-milk in such manner that a practically pure casein is produced. For that purpose the skim-milk is first passed through a centrifugal separator to remove the small remaining percentage of butter-fat. The curd is then precipitated by an acid, preferably sulfuric acid, and thoroughly washed to remove the milk-sugar, milk salts, salts of the reaction of the precipitating-acid, and other soluble matters. The curd is well drained or pressed and then ground, together with the syrupy calcium acid phosphate, between millstones or by other suitable means to a uniform mass, which may range in consistency from that of a creamy liquid to that of mush. This mass is dried in any suitable manner—for instance, at a low temperature *in vacuo* or under atmospheric pressure at a temperature of 212° Fahrenheit or more—upon a rotating steam-heated cylinder. The resulting dry product is a composition of calcium acid phosphate and casein and is practically stable and non-hygroscopic.

Instead of preparing the dry casein directly from skim-milk a soluble casein compound—for instance, sodium casein—can first be formed and the casein can be precipitated from the solution of this compound by an acid—for instance, acetic acid.

The calcium acid phosphate should be so prepared that it is practically free from impurities, particularly free from sulfuric acid.

The foregoing proportions are given as an illustration of a practical way of producing the desired composition; but I do not wish to limit myself to the same.

Crystallized calcium acid phosphate can be combined with comparatively dry casein by grinding the ingredients together; but the use of the crystallized salt is not desirable, as it involves an unnecessary expense.

This composition, consisting of monocalcic phosphate and casein, is used as the acid ingredient of baking-powder in the usual way in which such powders are compounded. For instance, it is mixed in the proper proportion with a suitable carbonate, such as bicarbonate of soda, and a suitable filler, such as starch. A suitable proportion of these ingredients consists of one hundred parts, by weight, of said acid ingredients, forty-seven parts of bicarbonate of soda, and nineteen parts of starch. The casein acts as an acid with reference to the carbonate and enhances to that extent the gas-liberating effect of the salt. A baking-powder composed of these ingredients possesses a considerably higher degree of efficiency than the usual commercial powders, because it generates more gas and has the further advantage that it introduces into the baked goods casein, which forms a very important addition to the nutritive ingredients of the same, while the residues formed by this baking-powder are entirely unobjectionable.

In mixing ordinary baking-powders it is necessary to pay close attention to the proportion of the ingredients. If the powder contains an excess of alkali, there will be free alkali in the baking. This darkens the color and injures the flavor and taste. In order to avoid a residue of free alkali after the reaction has ceased, the proportions are usually so selected that the acid ingredient is slightly in excess. This leaves free acid in the baking, which is less objectionable. If the above-described acid ingredient is present in excess in the powder, such excess is not objectionable, because the acid ingredient has a high nutritive value and produces none of the objectionable residues or effects of the ordinary acid ingredients. The proportion of the acid ingredient can therefore be safely made much larger than is necessary for producing the desired reaction.

I claim as my invention—

1. The herein-described composition of matter consisting of calcium acid phosphate and casein.

2. A baking-powder composed of the herein-described composition of matter consisting of calcium acid phosphate and casein, a carbonate and a filler.

3. The herein-described composition of matter consisting of calcium acid phosphate and casein substantially free from milk-sugar, salts, and other ingredients of milk, substantially as set forth.

4. A baking-powder composed of the herein-described composition of matter consisting of calcium acid phosphate and casein substantially free from milk-sugar, salts, and other ingredients of milk, a carbonate and a filler, substantially as set forth.

Witness my hand this 15th day of May, 1901.

JOHN A. JUST.

Witnesses:
DANIEL H. STRACHAN,
A. LEWIS MASON.